US007023853B1

(12) United States Patent
Bechtolsheim et al.

(10) Patent No.: US 7,023,853 B1
(45) Date of Patent: *Apr. 4, 2006

(54) ACCESS CONTROL LIST PROCESSING IN HARDWARE

(75) Inventors: Andreas V. Bechtolsheim, Stanford, CA (US); David R. Cheriton, Palo Alto, CA (US)

(73) Assignee: Cisco Technology, Inc., San Jose, CA (US)

( * ) Notice: Subject to any disclaimer, the term of this patent is extended or adjusted under 35 U.S.C. 154(b) by 297 days.

This patent is subject to a terminal disclaimer.

(21) Appl. No.: 10/087,342

(22) Filed: Mar. 1, 2002

Related U.S. Application Data

(63) Continuation of application No. 09/108,071, filed on Jun. 30, 1998, now Pat. No. 6,377,577.

(51) Int. Cl.
*H04L 12/28* (2006.01)

(52) U.S. Cl. .................................... 370/392

(58) Field of Classification Search ............. 370/392, 370/393, 394, 396, 397, 398, 389, 400, 399, 370/395.32; 709/220, 221, 222, 227, 228, 709/229; 711/108
See application file for complete search history.

(56) References Cited

U.S. PATENT DOCUMENTS

| 5,386,413 | A | * | 1/1995 | McAuley et al. ........... 370/392 |
| 5,414,704 | A | * | 5/1995 | Spinney .................... 370/389 |
| 5,509,006 | A | * | 4/1996 | Wilford et al. ............. 370/401 |
| 5,920,886 | A | * | 7/1999 | Feldmeier ................... 711/108 |
| 5,938,736 | A | * | 8/1999 | Muller et al. ............... 709/243 |

OTHER PUBLICATIONS

Alessandri, Access Control List Processing in Hardware, Diploma Thesis, pp. 1-85, Oct. 1997.*
Miei et al, Parallelization of IP-Packet Filter Rules, IEEE, pp. 381-388, 1997.*

(Continued)

*Primary Examiner*—Frank Duong
(74) *Attorney, Agent, or Firm*—Campbell Stephenson Ascolese LLP

(57) ABSTRACT

The invention provides for hardware processing of ACLs and thus hardware enforcement of access control. A sequence of access control specifiers from an ACL are recorded in a CAM, and information from the packet header is used to attempt to match selected source and destination IP addresses or subnets, ports, and protocols, against all the ACL specifiers at once. Successful matches are input to a priority selector, which selects the match with the highest priority (that is, the match that is first in the sequence of access control specifiers). The specified result of the selected match is used to permit or deny access for the packet without need for software processing, preferably at a rate comparable to wirespeed. The CAM includes an ordered sequence of entries, each of which has an array of ternary-elements for matching "0", "1", or any value, and each of which generates a match signal. The ACL entered for recording in the CAM can be optimized to reduce the number of separate entries in the CAM, such as by combining entries which are each special cases of a more general access control specifier. A router including the CAM can also include preprocessing circuits for certain range comparisons which have been found both to be particularly common and to be otherwise inefficiently represented by the ternary nature of the CAM, such as comparisons of the port number against known special cases such as "greater than 1023" or "within the range 6000 to 6500".

63 Claims, 3 Drawing Sheets

OTHER PUBLICATIONS

McAuley et al, Fast Routing Table Lookup Using CAMs, Bellcore, pp. 1-10, 1993.*

Doeringer et al, Routing on Longest-Matching Prefixes, IEEE, pp. 86-97, 1996.*

Shaffer, Designing Very Large Content-Addressable Memories, University of Pennsylvania, pp. 1-38, 1992.*

Molitor, Architecture for Advanced Packet Filtering, USENIX UNIX Security Symposium, pp. 1-13, 1995.*

* cited by examiner

ACCESS CONTROL LIST PROCESSING IN HARDWARE

Continuation of prior application Ser. No. 09/108,071 filed on Jun. 30, 1998 now U.S. Pat. No. 6,377,577 entitled: ACCESS CONTROL LIST PROCESSING IN HARDWARE.

BACKGROUND OF THE INVENTION

1. Field of the Invention

This invention relates to access control list processing.

2. Related Art

In a computer network for transmitting information, messages can be restricted from being transmitted from selected source devices to selected destination devices. In known computer networks, this form of restriction is known as "access control" and is performed by routers, which route messages (in the form of individual packets of information) from source devices to destination devices. One known technique for access control is for each router to perform access control by reference to one or more ACLs (access control lists); the ACL describes which selected source devices are permitted (and which denied) to send packets to which selected destination devices.

In a known standard for ACL format, each ACL includes a plurality of access control specifiers, each of which selects a range of sender and destination IP address prefix or subnet, and port, and provides that packet transmission from that selected set of senders to that selected set of destinations is either specifically permitted or specifically denied. ACLs are associated with input interfaces and independently with output interfaces for each router. In known routers such as those manufactured by Cisco Systems, Inc., of San Jose, Calif., the router is provided with an ACL using an ACL command language, interpreted by operating system software for the router, such as the IOS operating system.

One problem in the known art is that processing of packets to enforce access control according to the ACL is processor-intensive and can therefore be relatively slow, particularly in comparison with desired rates of speed for routing packets. This problem is exacerbated when access control is enforced for packets using software in the router, because software processing of the ACL can be quite slow relative to hardware processing of the packet for routing.

One known solution is to reduce the number of packets for which access control requires actual access to the ACL. In a technique known as "netflow switching," packets are identified as belonging to selected "flows," and each packet in a flow is expected to have identical routing and access control characteristics. Therefore, access control only requires reference to the ACL for the first packet in a flow; subsequent packets in the same flow can have access control enforced identically to the first packet, by reference to a routing result cached by the router and used for the entire flow.

Netflow switching is further described in detail in the following patent applications:

U.S. application Ser. No. 08/581,134, titled "Method For Traffic Management, Traffic Prioritization, Access Control, and Packet Forwarding in a Datagram Computer Network", filed Dec. 29, 1995, in the name of inventors David R. Cheriton and Andreas V. Bechtolsheim, assigned to Cisco Technology, Inc.;

U.S. application Ser. No. 08/655,429, titled "Network Flow Switching and Flow Data Export", filed May 28, 1996, in the name of inventors Darren Kerr and Barry Bruins, and assigned to Cisco Technology, Inc.; and U.S. application Ser. No. 08/771,438, titled "Network Flow Switching and Flow Data Export", filed Dec. 20, 1996, in the name of inventors Darren Kerr and Barry Bruins, assigned to Cisco Technology, Inc.

These patent applications are collectively referred to herein as the "Netflow Switching Disclosures". Each of these applications is hereby incorporated by reference as if fully set forth herein.

While netflow switching achieves the goal of improving the speed of enforcing access control by the router, it still has the drawback that comparing at least some incoming packets against the ACL must be performed using software. Thus, the relative slowness required by software processing of the ACL is not completely avoided.

SUMMARY OF THE INVENTION

The invention provides a method for processing of access control lists and thus enforcement of access control. A plurality of access control specifiers are configured in an access control element according to the priority of the type of each access control specifier, one or more characteristics of a packet are matched with the access control specifiers, one of the matches is selected according to the access control specifier with the highest associated priority, and the selected packet is processed. Types of access control specifiers correspond to the information in an access control entry. In one aspect of the present invention, an access control element is a content addressable memory. In another aspect of the present invention, the matching and processing are performed in parallel. In a further aspect of the present invention, the characteristics of the packet include one or more of a source address, a destination address, a source port, a destination port, a protocol type, an input interface and an output interface. In another aspect of the present invention, one or more of the access control specifiers are identified based on the matching and the identified access control specifiers are prioritized based on the matching.

The present invention further provides a system for processing a packet. The system includes one or more access control specifiers, an access control element, and a priority encoder. The access control specifiers are have a plurality of types and those types are related to information in an access control entry. The access control element is configured to store the access control specifiers according to the priority of each access control specifier and to match one or more characteristics of a packet with the access control specifiers. The priority encoder is configured to select the highest priority match from among the matches. In one aspect of the present invention, the access control specifier further includes a label match mask for determining whether a first bit of the packet characteristics is tested and a label match pattern for comparing to a second bit of the packet characteristics. In another aspect of the present invention, a processor is coupled to the access control element to process a packet not otherwise processed by the access control element.

The present invention also provides a system for processing a packet that includes a means for configuring a plurality of access control specifiers in an access control element according to a priority of a type of each access control specifier, a means for matching one or more characteristics of the packet with one or more of the access control specifiers, and a means for processing the packet based on the matching.

The present invention further provides a system that includes a means for maintaining a set of access control patterns, means for receiving a packet label responsible to a packet, means for matching matchable information responsive to the packet and the access control patterns, means for generating a set of matches in response to the means for matching, means for selecting at least one of the matches in response to priority information in the set of matches and generating an access result in response thereto, and a means for making a routing decision based on the access result.

The present invention also provides a method for processing a packet that includes selecting an output interface to which to forward the packet, determining forwarding permission for the packet by matching one or more characteristics of the packet with one or more access control specifiers, and processing the packet based on the forwarding permission, wherein the selecting and the determining are performed in parallel.

DETAILED DESCRIPTION OF THE PREFERRED EMBODIMENT

In the following description, a preferred embodiment of the invention is described with regard to preferred process steps and data structures. Those skilled in the art would recognize after perusal of this application that embodiments of the invention can be implemented using circuits adapted to particular process steps and data structures described herein, and that implementation of the process steps and data structures described herein would not require undue experimentation or further invention.

System Elements

Figure 1:
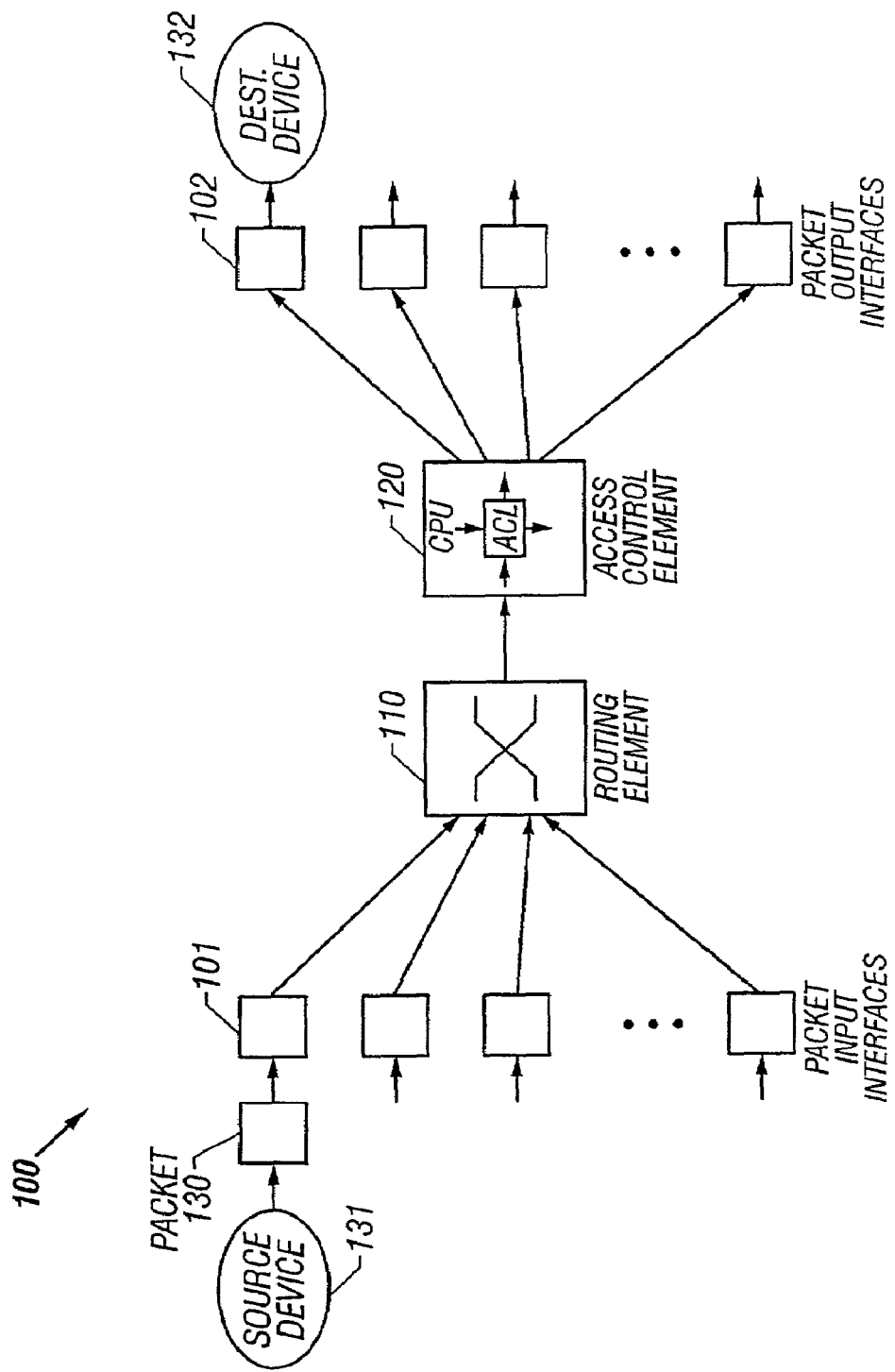
FIG. 1 shows a block diagram of a system for access control list processing.

FIG. 1 shows a block diagram of a system for access control list processing.

A system 100 includes a set of packet input interfaces 101, a routing element 110, an access control element 120, and a set of packet output interfaces 102. The system 100 receives packets 130 at the input interfaces 101; each packet 130 indicates a source device 131, from which it was sent, and a destination device 132, to which it is intended to go. The routing element 110 processes each packet 130 to select one or more of the output interfaces 102 to which the packet 130 should be forwarded. The access control element 120 determines if the packet 130 has permission to be forwarded from its source device 131 to its destination device 132. Each packet 130 that has permission to be forwarded is output to its selected output interfaces 102.

In a first set of alternative embodiments, the system 100 may include a plurality of access control elements 120 operating in parallel in place of the single access control element 120.

In a second set of alternative embodiments, the system 100 may include one or more access control elements 120 coupled to the input interfaces 101 and operating to determine if packets 130 have permission to be forwarded from their source devices 131 at all. The access control element 120 is shown coupled to the routing element 110 to perform access control after a routing decision has been made. However, the access control element 120 is still capable of denying access to packets 130 responsive to whether they have permission to be forwarded from their source devices 131 at all.

In a third set of alternative embodiments, the system 100 may include one or more access control elements 120 coupled to individual input interfaces 101 and operating to make access control determinations for packets 0.130 arriving at particular input interfaces 101. Similarly, the system 100 may include one or more access control elements 120 coupled to individual output interfaces 102 and operating to make access control determinations for packets 130 forwarded to particular output interfaces 102.

Access Control Element

Figure 2:
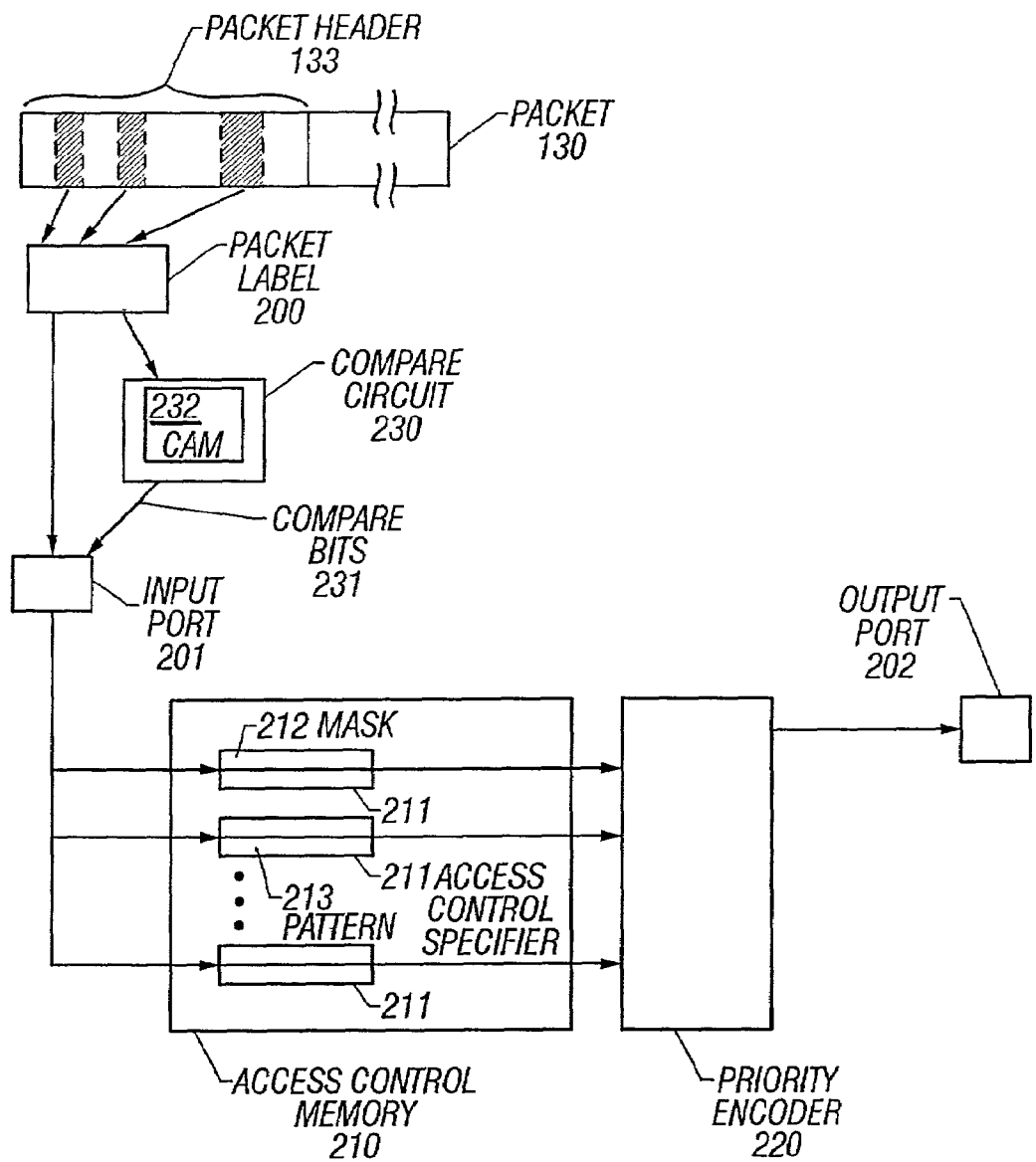
FIG. 2 shows a block diagram of an access control element.

FIG. 2 shows a block diagram of an access control element.

In a preferred embodiment, the access control element 120 operates on a set of selected elements of a packet header 133 for each packet 130. The system 100 collects the selected elements into a packet label 200.

In a preferred embodiment using netflow switching, the packet label 200 used for access control at the input interfaces 101 includes a source device 131, the destination device 132, a port identifier for a port at the source device 131, a port identifier for a port at the destination device 132, and a protocol type. In alternative embodiments, the packet label 200 may be any collection of information derived from the packet 130 (preferably from the packet header 133) used for access control.

The concept of preprocessing the packet label has wide applicability, including determining other routing information in response to data in the packet header. For example, in addition to or instead of comparing data in the packet header against known special cases, such as "greater than 1023" and "within the range 6000 to 6500," preprocessing can include performing logical or arithmetic operations on data in the packet header. Preprocessing can also include data lookup, or substituting new data, in response to data in the packet header.

The access control element 120 includes an input port 201 coupled to the packet label 200, an access control memory 210, a priority encoder 220, and an output port 202 coupled to the priority encoder 220.

When the access control element 120 is disposed for controlling access for packets responsive to their input interfaces 101, the packet label 200 includes an identifier for the input interface 101. When the access control element 120 is disposed for controlling access for packets responsive to their output interfaces 102, the packet label 200 includes an identifier for the output interface 102.

The access control memory 210 includes a CAM (content-addressable memory) having a sequence of access control specifiers 211. Each access control specifier 211 includes a label match mask 212 and a label match pattern 213. For each access control specifier 211, each bit of the label match mask 212 determines whether or not a corresponding bit of the packet label 200 is tested. If so, the corresponding bit of the label match pattern 213 is compared for equality with the corresponding bit of the packet label 200. If all compared bits are equal, the access control specifier 211 matches the packet label 200. Bits that are not compared have no effect on whether the access control specifier 211 is considered to match the packet label 200 or not.

The priority encoder 220 is coupled to all of the access control specifiers 211, and receives an indicator from each one whether or not that access control specifier 211 matched the packet label 200. The priority encoder 220 selects the single access control specifier 211 with the highest priority (in a preferred embodiment, the one with the lowest address in the access control memory 210) and provides an indicator of that single access control specifier 211 to the output port 202.

The indicator provided to the output port 202 specifies whether or not the packet 130 has permission to be forwarded from its specified source device 131 to its specified destination device 132. In a preferred embodiment, the indicator specifies one of three possibilities: (a) the packet 130 is forwarded to its calculated output interface and on to its specified destination device 132; (b) the packet 130 is dropped; or (c) the packet 130 is forwarded to a "higher-level" processor for further treatment. When a packet 130 is dropped it is effectively denied access from its specified source device 131 to its specified destination device 132.

The higher-level processor includes a general-purpose processor, program and data memory, and mass storage, executing operating system and application software for software (rather than hardware) examination of the packet 130. The packet 130 is compared, possibly to the access control specifiers 211 and possibly to other administrative policies or restrictions, by the higher-level processor. The higher-level processor specifies whether the packet 130, after processing by the higher-level processor, is forwarded to a selected output interface or is dropped.

Access Control Lists

A Cisco access control list includes a sequence of access control entries, which are mapped to a set of access control specifiers 211. Each access control entry has a structure according to the following syntax:

access-list access-list-number [dynamic dynamic-name [timeout minutes]] {deny|permit} protocol source source-wildcard [operator port [port]] destination destination-wildcard [operator port [port]] [established] [precedence precedence] [tos tos] [log]

This syntax, its meaning, and access control entries in general, are further described in documentation for Cisco IOS software, available from Cisco Systems, Inc., in San Jose, Calif., and hereby incorporated by reference as if fully set forth herein.

Access control entries can specify that particular actions are permitted, denied, or that they will be recorded in a log. Access control entries are interpreted sequentially. Thus, an earlier more specific access control entry can prohibit particular actions (such as receiving messages from a particular sending device), while a later more general access control entry can permit the same actions for other devices (such as other sending devices in the same network).

When an access control list is translated for entry into the access control memory, it is optimized to reduce the number of separate entries that are used. Thus, an access control list with N separate access control entries is translated into a set of access control specifiers 211 that can be smaller or larger than N, depending on the effect of optimization.

A first optimization detects separate access control entries that each refer to a special case of a more general access control specifier 211, such as in one of the following cases:

A first access control entry provides a selected permission for a selected source device 131 2S, and a second access control entry provides the same permission for a selected source device 131 2S+1. The first and second access control entries can be translated into a single more general access control specifier 211 with an unmatched bit in the 2° position.

A set of access control entries each provides the same selected permission for a range of selected source devices 131 S through T, and the range S through T can be represented as a smaller number of bit strings with unmatched bits.

A set of access control entries provides a selected permission for a comparison of source device 131 addresses with a test value V.

A second optimization detects range comparisons that have been found to be particularly common. For example, it is common to compare the source or destination port number for being greater than 1023, or for being within the range 6000 to 6500. To compare the source or destination port number for being greater than 1023 with matched and unmatched bits would use about six entries for each such comparison (to test each one of the six high-order bits of the port number for being logical "1").

In a preferred embodiment, a comparison circuit 230 compares the source port number and the destination port number with these known ranges and provides a set of comparison bits 231 indicating whether or not the source port number and the destination port number are within each specified range. The comparison circuit 230 includes a finite state machine 232 (or other element) for storing lower and upper bounds for each specified range. The comparison bits 231 are coupled to the input port 201 of the access control element 120 for treatment as matchable input bits supplemental to the header of the packet 130.

In various embodiments, the invention can be used to augment or override routing decisions otherwise made by the router, using the access control element 120. In addition to specifying that the packet 130 is to be dropped or forwarded to the higher-level processor, the access control element 120 can alter the output interface, which was selected by the routing element 110, to another selected output interface. The invention can thus be used to implement QOS (quality of service) policies and other administrative policies.

Method of Operation

Figure 3:
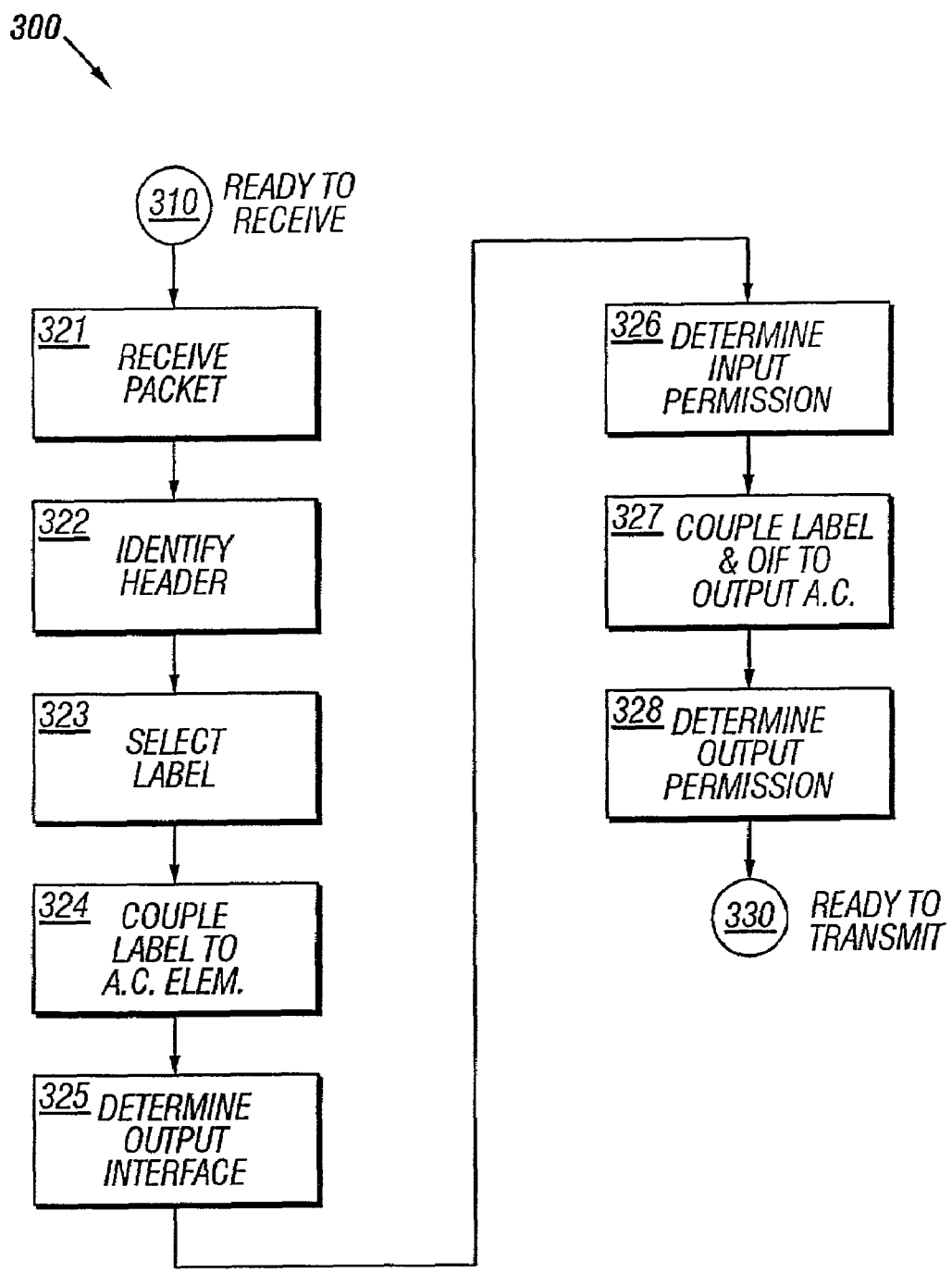
FIG. 3 shows a flow diagram of a method for access control list processing in hardware.

FIG. 3 shows a flow diagram of a method for access control list processing in hardware.

A method 300 includes a set of flow points to be noted, and steps to be executed, cooperatively by the elements of the system 100.

At a flow point 310, a packet is received at one of the packet input interfaces 101.

At a step 321, the routing element 110 receives an input packet 130.

At a step 322, the routing element 110 identifies the header for the packet 130.

At a step 323, the routing element 110 selects portions of the header for use as the packet label 200 for access control. In a preferred embodiment, the packet label 200 used for access control at the input interfaces 101 includes the source device 131, the destination device 132, the port identifier at the source device 131, the port identifier at the destination device 132, and a protocol type.

At a step 324, the routing element 110 couples the packet label 200 and an input interface specifier to the input access control element 120.

At a step 325, the routing element 110 determines a selected output interface for the packet 130.

At a step 326, preferably performed in parallel with the step 325, the input access control element 120 determines the input permission for the packet 130, that is, whether the routing element 110 permits forwarding the packet 130 from the source device 131 for the packet 130.

The step 326 includes matching the packet label 200 against the access control memory 210 for the input access control element 120, determining all of the successful matches, coupling the successful matches to the priority encoder 220 for the input access control element 120, determining the highest-priority match, and providing an output result from the input access control element 120.

If at the step 326, the input access control element 120 determines that the higher-level processor should process the packet 130, the higher-level processor processes the packet 130. A result from the higher-level processor is substituted for the result from the input access control element 120.

If at the step 326, the input access control element 120 (or the higher-level processor) determines that the packet 130 should be dropped, the packet 130 is dropped, and the routing element 110 takes no further action with regard to the packet 130.

At a step 327, the routing element 110 couples the packet label 200 and the output interface specifier to the output access control element 120.

At a step 328, the output access control element 120 determines the output permission for the packet 130, that is, whether the routing element 110 permits forwarding the packet 130 to the destination device 132 for the packet 130.

The step 326 includes the following actions:
matching the packet label 200 against the access control memory 210 for the output access control element 120;
determining all of the successful matches;
coupling the successful matches to the priority encoder 220 for the output access control element 120;
determining the highest-priority match; and
providing an output result from the output access control element 120.

If at the step 328, the output access control element 120 determines that the higher-level processor should process the packet 130, the higher-level processor processes the packet 130. A result from the higher-level processor is substituted for the result from the output access control element 120.

If at the step 328, the output access control element 120 (or the higher-level processor) determines that the packet 130 should be dropped, the packet 130 is dropped, and the routing element 110 takes no further action with regard to the packet 130.

At a flow point 330, the packet is ready for transmission to one of the packet output interfaces 102.

ALTERNATIVE EMBODIMENTS

Although preferred embodiments are disclosed herein, many variations are possible which remain within the concept, scope, and spirit of the invention, and these variations would become clear to those skilled in the art after perusal of this application.

What is claimed is:

1. A method of processing a packet comprising:
configuring a plurality of access control specifiers in an access control element according to a priority of a type of each access control specifier, wherein
the type of an access control specifier corresponds to information in an access control entry;
matching one or more characteristics of said packet with one or more of the access control specifiers;
selecting a match corresponding to an access control specifier with a highest associated priority; and
processing said packet based on said selecting.

2. The method of claim 1, wherein said access control element is a content addressable memory.

3. The method of claim 1, wherein said matching and said processing is done in parallel.

4. The method of claim 1, wherein said characteristics of said packet comprises one or more of a source address, a destination address, a source port, a destination port, a protocol type, an input interface and an output interface.

5. The method of claim 1, wherein said characteristics of said packet comprises data carried by said packet in a packet header.

6. The method of claim 1, further comprising:
receiving said packet.

7. The method of claim 1, further comprising:
identifying one or more of said access control specifiers based on said matching.

8. The method of claim 7, further comprising:
prioritizing said one or more of said access control specifiers identified based on said matching to generate a set of prioritized access control specifiers.

9. The method of claim 8, wherein said prioritizing is done in parallel by a priority encoder.

10. The method of claim 8, wherein said prioritizing is done based on an address of said access control specifiers in said access control element.

11. The method of claim 8, wherein said processing is done based on said set of prioritized access control specifiers.

12. The method of claim 1, wherein said processing further comprising:
if said packet requires processing by a higher-level processor,
forwarding said packet to said higher-level processor.

13. The method of claim 1, further comprising:
if said packet requires dropping,
dropping said packet.

14. The method of claim 1, further comprising:
if said packet requires forwarding,
forwarding said packet.

15. The method of claim 1, wherein said one or more access control specifiers include a label match mask and a label match pattern.

16. The method of claim 1 further comprising:
a plurality of types of access control specifiers, wherein each type of access control specifier corresponds to a respective packet field.

17. A system for processing a packet comprising:
one or more access control specifiers, wherein
said one or more access control specifiers are of one or more types of access control specifiers, and
said one or more types of access control specifiers being related to information in an access control entry;
an access control element, wherein
said access control element is configured to
store said one or more access control specifiers according to a priority of the type of each access control specifier, and
match one or more characteristics of said packet with one or more access control specifiers; and
a priority encoder coupled to said access control element, wherein said priority encoder is configured to
select a highest priority match based on the priority of the types of access control specifiers.

18. The system of claim 17, wherein said priority encoder is further configured to
prioritize said one or more access control specifiers according to an address of said one or more access control specifiers in said access control element.

19. The system of claim 17, further comprising:
a compare unit coupled to said access control element, wherein said compare unit is configured to compare said one or more characteristics of said packet with one or more values.

20. The system of claim 19, wherein said one or more values are predetermined.

21. The system of claim 19, wherein said one or more values are dynamically determined.

22. The system of claim 19, wherein said compare unit is further configured to
perform arithmetic operation on data carried by said packet in a packet header.

23. The system of claim 19, wherein said compare unit is further configured to
perform logical operation on said data carried by said packet in said packet header.

24. The system of claim 17, wherein said access control element further comprising:
an access control memory.

25. The system of claim 24, wherein said access control memory is a content-addressable memory.

26. The method of claim 24, wherein said access control memory stores at least one of said access control specifier.

27. The system of claim 24, wherein said access control specifier further comprising:
a label match mask configured to determine whether a first corresponding bit of said one or more characteristics of said packet is tested; and
a label match pattern, wherein said label match pattern is compared with a second corresponding bit of said one or more characteristics of said packet.

28. The system of claim 17, further comprising:
a processor, coupled to said access control element, said processor is configured to process said packet when said packet is not processed by said access control element.

29. The system of claim 17, further comprising:
at least one input port coupled to said access control element, wherein said input port is configured to receive said packet; and
at least one output port coupled to said access control element, wherein said packet is forwarded via said output port.

30. The system of claim 17, wherein said one or more access control specifiers include a label match mask and a label match pattern.

31. The system of claim 17 further comprising:
a plurality of types of access control specifiers, wherein each type of access control specifier corresponds to a respective packet field.

32. A system for processing a packet comprising:
means for configuring a plurality of access control specifiers in an access control element according to a priority of a type of each access control specifier, wherein the type of an access control specifier corresponds to information in an access control entry;
means for matching one or more characteristics of said packet with one or more of the access control specifiers;
means for selecting a match corresponding to an access control specifier with a highest associated priority; and
means for processing said packet based on said matching.

33. The system of claim 32, wherein said access control element is a content addressable memory.

34. The system of claim 32, wherein said matching and said processing is done in parallel.

35. The system of claim 32, wherein said characteristics of said packet comprises one or more of a source address, a destination address, a source port, a destination port, a protocol type, an input interface and an output interface.

36. The system of claim 32, wherein said characteristics of said packet comprises data carried by said packet in a packet header.

37. The system of claim 32, further comprising:
means for receiving said packet.

38. The system of claim 32, further comprising:
means for identifying one or more of said access control specifiers based on said matching.

39. The system of claim 38, further comprising:
means for prioritizing said one or more of said access control specifiers identified based on said matching to generate a set of prioritized access control specifiers.

40. The system of claim 39, wherein said prioritizing is done in parallel by a priority encoder.

41. The system of claim 39, wherein said prioritizing is done based on an address of said access control specifiers in said access control element.

42. The system of claim 39, wherein said processing is done based on said set of prioritized access control specifiers.

43. The system of claim 32, wherein said processing further comprising:
means for forwarding said packet to said higher-level processor if said packet requires processing by a higher-level processor.

44. The system of claim 32, further comprising:
means for dropping said packet if said packet requires dropping.

45. The system of claim 32, further comprising:
means for forwarding said packet if said packet requires forwarding.

46. A system comprising:
means for maintaining a set of access control patterns in at least one associative memory;
means for receiving a packet label responsible to a packet, said packet label being sufficient to perform access control processing for said packet;
means for matching matchable information, said matchable information being responsive to said packet label, with said set of access control patterns in parallel;
means for generating a set of matches in response thereto, each said match having priority information associated therewith;
means for selecting at least one of said matches in response to said priority information, and generating an access result in response to said at least one selected match; and
means for making a routing decision in response to said access result.

47. The system of claim 46 further comprising:
means for choosing a first one of said matches.

48. The system of claim 46, further comprising:
means for determining an output interface for said packet.
49. The system of claim 46, further comprising:
means for implementing a quality of service policy.
50. The system of claim 46, further comprising:
means for permitting or denying access for said packet.
51. The system of claim 46, further comprising:
means for making a preliminary routing decision for said packet.
52. The method of claim 46, further comprising:
means for determining at least one output interface for said packet.
53. The system of claim 52, further comprising:
means for performing one or more of an arithmetic, logical, and comparison operation on said packet label; and
means for generating a bit string for said matchable information in response to said arithmetic, logical, and comparison operation.
54. The system of claim 46, further comprising:
means for preprocessing said packet label; and
means for generating said matchable information.
55. The system of claim 46, further comprising:
means for comparing a field of said packet label with an arithmetic range or mask value.
56. The system of claim 46, further comprising:
means for comparing a source IP port value or a destination IP port value with a selected port value.
57. The system of claim 46, further comprising:
means for postprocessing said selected match to generate said access result.
58. The system of claim 46, further comprising:
means for accessing a memory in response to a bitstring included in said selected match.
59. The system of claim 46, further comprising:
means for declaring whether to permit or deny access of a set of packets.
60. The system of claim 46, further comprising:
means for receiving a sequence of access control specifiers;
means for translating said sequence of access control specifiers into a sequence of access control patterns; and
means for storing said sequence of access control patterns in said associative memory.
61. The system of claim 46, further comprising:
means for generating a single one of said access control patterns in response to a plurality of said access control specifiers.
62. The system of claim 46, further comprising:
means for generating a single one of said access control patterns in response to a plurality of said access control specifiers.
63. A method of processing a packet comprising:
selecting an output interface to which to forward the packet;
determining forwarding permission for the packet, wherein
the determining comprises
matching one or more characteristics of said packet with one or more access control specifiers in at least one access control element;
processing said packet based on said forwarding permission;
wherein,
the selecting step is performed in parallel with the determining step.

\* \* \* \* \*